US012057544B2

(12) United States Patent
Zheng et al.

(10) Patent No.: US 12,057,544 B2
(45) Date of Patent: Aug. 6, 2024

(54) BARE CELL FILM COATING APPARATUS AND METHOD, AND BATTERY MANUFACTURING SYSTEM

(71) Applicant: CONTEMPORARY AMPEREX TECHNOLOGY CO., LIMITED, Ningde (CN)

(72) Inventors: Zhijian Zheng, Ningde (CN); Xiang Fan, Ningde (CN); Yuqun Zhou, Ningde (CN); Chang Hong, Ningde (CN); Wenqing Nie, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/197,486

(22) Filed: May 15, 2023

(65) Prior Publication Data
US 2023/0282870 A1 Sep. 7, 2023

Related U.S. Application Data

(63) Continuation of application No. PCT/CN2022/120867, filed on Sep. 23, 2022.

(30) Foreign Application Priority Data

Feb. 28, 2022 (CN) .......................... 202210188096.3

(51) Int. Cl.
*H01M 10/04* (2006.01)
*H01M 50/10* (2021.01)
*H01M 50/136* (2021.01)

(52) U.S. Cl.
CPC ....... *H01M 10/0404* (2013.01); *H01M 50/10* (2021.01); *H01M 50/136* (2021.01)

(58) Field of Classification Search
CPC . H01M 10/0404; H01M 50/136; H01M 50/10
See application file for complete search history.

(56) References Cited

FOREIGN PATENT DOCUMENTS

| CN | 109065938 A | * 12/2018 | ........ H01M 10/0404 |
|----|-------------|-----------|----------------------|
| CN | 109065938 A | 12/2018   |                      |

(Continued)

OTHER PUBLICATIONS

International Search Report issued Nov. 30, 2022 in corresponding International Patent Application No. PCT/CN2022/120867 (with machine-generated English translation), 6 pages.

(Continued)

*Primary Examiner* — Jimmy Vo
(74) *Attorney, Agent, or Firm* — XSENSUS LLP

(57) ABSTRACT

This application relates to a bare cell film coating apparatus and method, and a battery manufacturing system. The bare cell film coating apparatus includes: a supporting assembly, configured to support a cell assembly; and a film coating assembly, configured to apply a coating of an insulation film to a bare cell in the cell assembly placed on the supporting assembly. The film coating assembly includes a mounting bracket and two clamping assemblies configured to clamp the insulation film. Both clamping assemblies are rotatably disposed on the mounting bracket around a rotation axis consistent with a first direction and are spaced out along a second direction perpendicular to the first direction.

16 Claims, 10 Drawing Sheets

(56) References Cited

FOREIGN PATENT DOCUMENTS

| | | | |
|---|---|---|---|
| CN | 109713351 A | | 5/2019 |
| CN | 113725472 A | | 11/2021 |
| CN | 217214826 U | * | 8/2022 |
| CN | 217214826 U | | 8/2022 |
| JP | 2006278245 A | | 10/2006 |

OTHER PUBLICATIONS

Written Opinion issued Nov. 30, 2022 in corresponding International Patent Application No. PCT/CN2022/120867 (with machine-generated English translation), 7 pages.

* cited by examiner

BARE CELL FILM COATING APPARATUS AND METHOD, AND BATTERY MANUFACTURING SYSTEM

CROSS-REFERENCE TO RELATED APPLICATION

This application is a continuation of PCT Patent Application No. PCT/CN2022/120867, entitled "BARE CELL FILM COATING APPARATUS AND METHOD, AND BATTERY MANUFACTURING SYSTEM" filed on Sep. 23, 2022, which claims priority to Chinese Patent Application No. 202210188096.3, entitled "BARE CELL FILM COATING APPARATUS AND METHOD, AND BATTERY MANUFACTURING SYSTEM" filed with the State Intellectual Property Office of P. R. China on Feb. 28, 2022, all of which is incorporated herein by reference in its entirety.

TECHNICAL FIELD

This application relates to the technical field of battery manufacturing, and in particular, to a bare cell film coating apparatus and method, and a battery manufacturing system.

BACKGROUND

Due to advantages such as a high energy density, a high power density, reusability for many cycles, a long shelf life, batteries such as lithium-ion batteries have been widely used in electric vehicles.

However, currently the insulation reliability of a battery is inferior, and a short-circuit problem is prone to occur during use of the battery, posing considerable hazards for the working safety of the battery.

SUMMARY

An objective of this application is to improve insulation reliability of a battery.

According to a first aspect of this application, a bare cell film coating apparatus is provided, including:

a supporting assembly, configured to support a cell assembly, where the cell assembly includes a bare cell and an end cap component connected to the bare cell; and a film coating assembly, configured to apply a coating of an insulation film to the bare cell in the cell assembly placed on the supporting assembly, where the film coating assembly includes a mounting bracket and two clamping assemblies configured to clamp the insulation film, both clamping assemblies are rotatably disposed on the mounting bracket around a rotation axis consistent with a first direction and are spaced out along a second direction, and the second direction is perpendicular to the first direction; the insulation film in an unfolded state faces a first end face of the bare cell, and the first end face is a surface that is of the bare cell and that is away from the end cap component; and the two clamping assemblies are configured to coat the first end face and two first lateral faces of the bare cell with the insulation film in a state of having rotated to a first position toward the first lateral faces of the bare cell, and the two first lateral faces intersect the first end face.

In an embodiment of this application, the cell assembly is placed upside down on the supporting assembly and is coated with an insulation film. The end cap component itself is of high processing precision. Therefore, the positioning precision of the cell assembly is improved by using the end cap component as a reference, without a need to realign the cell assembly through an external mechanical structure. In addition, the parts of the insulation film that are located on two sides of the bare cell along the second direction are clamped by two clamping assemblies, and then the clamping assemblies rotate to apply a coating of the insulation film. In this way, the insulation film is effectively controlled when being turned up. Moreover, the insulation film can be pulled to the position of an insulation piece in the end cap component by rotating the clamping assemblies, thereby implementing central alignment of the insulation film, solving the problem of inconsistent edge distances of the insulation film caused by skew of the bare cell, effectively ensuring consistency of a distance between an edge of the insulation film turned up and the insulation piece, and improving the fusion effect.

In some embodiments, each of the clamping assemblies is configured to apply a coating of the insulation film to a position at which the rotation axis of the clamping assembly coincides with a bent edge of the insulation film.

These embodiments make the bent edge of the insulation film close to the edge of the bare cell, and make the insulation film fit more closely with a sidewall of the bare cell, thereby implementing centrally aligned coating of the insulation film, effectively ensuring consistency of the distance between the edge of the insulation film turned up and the insulation piece, and improving the fusion effect.

In some embodiments, the film coating assembly further includes two first driving assemblies mounted on the mounting bracket and configured to drive the two clamping assemblies respectively to rotate independently.

In these embodiments, one first driving assembly is disposed for each of the two clamping assemblies, thereby automatically controlling the rotation of the clamping assemblies to implement automatic film coating, pulling the insulation film precisely to a preset position to ensure consistency of the distance between the edge of the insulation film and the insulation piece, improving the fusion effect, and ensuring reliability of insulation.

In some embodiments, the two first driving assemblies are configured to drive the two clamping assemblies to rotate synchronously.

These embodiments make the insulation films on the two sides of the bare cell turn up simultaneously, and make the force consistent on the two sides of the insulation film, thereby improving the central alignment of the insulation film with the bare cell during coating of the film, and ensuring consistency of the distance between the edge of the insulation film and the insulation piece along two sides of the second direction, improving the fusion effect, and ensuring reliability of insulation. In addition, the first end face and the two first lateral faces of the bare cell can be coated within only the time required for the rotation of a single clamping assembly.

In some embodiments, each clamping assembly includes two grippers spaced out along the first direction. Positions of the four grippers are configured to clamp four corners of the insulation film respectively.

In these embodiments, the four corners of the insulation film are clamped by four grippers respectively, so that the insulation film can be steadily conveyed to the top of the cell assembly. In a process of turning up the insulation film along two sides of the second direction, a constraint force can be exerted on a free end of the insulation film, and a traction force can be exerted on the two ends of the insulation film when the first driving assembly drives the clamping assemblies to rotate to implement film coating, thereby ensuring consistency of the distance between the edge of the insulation film and the insulation piece, improving the fusion effect, and ensuring reliability of insulation.

In some embodiments, each clamping assembly further includes a first beam and two second beams. The first beam extends along the first direction. Two ends of the first beam are rotatably mounted on the mounting bracket around the rotation axis. First ends of the two second beams are connected to the first beam at intervals along the first direction. One gripper is mounted at a second end of each of the two second beams.

In these embodiments, the first driving assembly drives the first beam to rotate, and the two second beams drive the two grippers to turn up the insulation film. The structure is simple, and the two grippers on the same side can move synchronously, thereby ensuring a good fit of the insulation film that overlays the bare cell.

In some embodiments, mounting positions of the second beams are adjustable against the first beam along the second direction.

In these embodiments, by adjusting the mounting positions of the second beams on the first beam, the distance between the gripper and the first beam along the second direction can be changed so as to adapt to the bare cells of different heights for film coating.

In some embodiments, the film coating assembly further includes two first driving assemblies mounted at two ends of the mounting bracket respectively along the first direction. The two first driving assemblies are configured to drive the two clamping assemblies respectively to rotate. Mounting positions of the first beam and the first driving assembly connected to the first beam are adjustable along the second direction.

In these embodiments, by adjusting the position of the first beam along the second direction, the distance between the two first beams can be adjusted to adapt to the bare cells of different thicknesses for film coating, thereby improving universal applicability of the bare cell film coating apparatus.

In some embodiments, each of the clamping assemblies includes a pressure exertion piece configured to exert a pressure on the insulation film when the clamping assembly is in the first position, so as to make the insulation film fit the bare cell.

In these embodiments, the pressure exertion piece can work together with the two grippers on the same side to limit the position of an edge region of the insulation film along the second direction, so as to prevent the edge from deforming in a process of turning up the insulation film, thereby implementing a steady status of the insulation film, ensuring consistency of the distance between the edge of the insulation film and the insulation piece, improving the fusion effect, and ensuring reliability of insulation.

In some embodiments, a mounting position of the pressure exertion piece is adjustable along the second direction.

In these embodiments, by adjusting the mounting position of the pressure exertion piece along the second direction, the distance between a pressure exertion position and the first beam can be adjusted. In this way, the pressure exertion piece can press down on the edge region of the insulation film when the bare cells of different heights are coated with an insulation film, thereby preventing the edge of the insulation film from warping, ensuring consistency of the distance between the edge of the insulation film and the insulation piece, improving the fusion effect, and ensuring reliability of insulation.

In some embodiments, the two clamping assemblies are configured to jointly clamp the insulation film when the bare cell is rotated to a second position along two sides of the second direction, where the insulation film is planar as a whole.

In these embodiments, the insulation film in a horizontal state in the film gripping position can be gripped jointly by the two clamping assemblies, thereby preventing unnecessary bending of the insulation film during the conveyance. The relative position relationship between the insulation film and the bare cell can be adjusted easily before film coating, so as to ensure a proper distance between the edge of the insulation film and the insulation piece.

In some embodiments, a film coating position is disposed on the supporting assembly. The film coating position is configured to be located in a middle position of the two clamping assemblies along the second direction during film coating.

In these embodiments, the film coating position can be caused to be located in the middle position of the two clamping assemblies during the film coating, and the insulation film can be aligned properly with the bare cell along the second direction. In this way, the distance between the edge of the insulation film and the insulation piece keeps consistent between the two sides of the insulation film, thereby improving insulation performance of the cell assembly.

In some embodiments, the bare cell film coating apparatus further includes a supporting bracket and a second driving assembly. The film coating assembly is mounted on the supporting bracket and is movable against the supporting bracket along the second direction. The second driving assembly is configured to drive the film coating assembly to move along the second direction, so as to reach a film gripping position or reach a film coating position on the supporting assembly.

In these embodiments, by disposing the second driving assembly, the film coating assembly can be moved transversely so as to move between the film gripping position and the film coating position. In this way, the insulation film can be automatically conveyed from the film gripping position to the film coating position, and can reach the film coating position by being gripped only once without a need to be conveyed for a plurality of times, thereby improving the positioning precision of the insulation film during film coating.

In some embodiments, the bare cell film coating apparatus further includes a supporting bracket and a third driving assembly. The film coating assembly is movably mounted on the supporting bracket along the third direction. The third direction is perpendicular to the first direction and the second direction. The third driving assembly is configured to drive the film coating assembly to move along the third direction.

In these embodiments, the position of the film coating assembly along the third direction is adjusted by the third driving assembly. Therefore, when gripping the insulation film, the clamping assembly can adapt to the height of the insulation film placed on the fusion platform, and, before film coating, can adjust the insulation film to fit the end face that is of the bare cell and that is away from the end cap component, so as to improve the film coating effect, and further, can adapt to the bare cells of different heights for film coating.

In some embodiments, the supporting assembly is in contact with the end cap component to support the cell assembly. The bare cell is located above the end cap component.

In these embodiments, the cell assembly is disposed upside down. The positioning of the cell assembly can be implemented in the film coating process through the end cap component, thereby improving the positioning precision and facilitating the film coating through the rotation of the two clamping assemblies.

In some embodiments, the supporting assembly includes:
a first platform, configured to hold the cell assembly; and
a positioning component, configured to position the end cap component.

In these embodiments, the positioning component is disposed to position the end cap component so as to provide positioning for the cell assembly. The end cap body in the end cap component is of relatively high processing precision. Therefore, the positioning performed through the end cap body and electrode terminals can improve the positioning precision of the cell assembly during the film coating, thereby ensuring consistency of the distance between the edge of the insulation film and the insulation piece, and improving the insulation performance of the cell assembly.

According to a second aspect of this application, a battery manufacturing system is provided, including the bare cell film coating apparatus according to the foregoing embodiment.

According to a third aspect of this application, a bare cell film coating method is provided, including:
a cell positioning step: positioning a cell assembly upside down onto a supporting assembly, where the cell assembly includes a bare cell and an end cap component connected to the bare cell;
a film position keeping step: causing an insulation film in an unfolded state to face a first end face of the bare cell, where the first end face is a surface that is of the bare cell and that is away from the end cap component; and
a cell film coating step: causing both of two clamping assemblies in the film coating assembly to rotate to a first position toward first lateral faces of the bare cell in the cell assembly, and coating the first end face and two first lateral faces of the bare cell with the insulation film, where the two first lateral faces intersect the first end face.

The two clamping assemblies are configured to clamp the insulation film, and are both rotatably disposed on the mounting bracket in the film coating assembly around a rotation axis consistent with a first direction. The two clamping assemblies are spaced out along a second direction. The second direction is perpendicular to the first direction.

In some embodiments, the bare cell film coating method further includes:
adjusting, before the cell film coating step, the two clamping assemblies along the second direction, so that the bare cell is located in a middle position of the two clamping assemblies along the second direction; and
adjusting a position of the film coating assembly along a third direction so that the insulation film fits, in the third direction, an end face that is of the bare cell and that is away from the end cap component in the cell assembly, where the third direction is perpendicular to the first direction and the second direction.

In some embodiments, the bare cell film coating method further includes:

causing the film coating assembly to move to a film gripping position along the second direction to grip the insulation film; and
causing the film coating assembly to move from the film gripping position to a film coating position on the supporting assembly along the second direction.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION OF EMBODIMENTS

Figure 1:
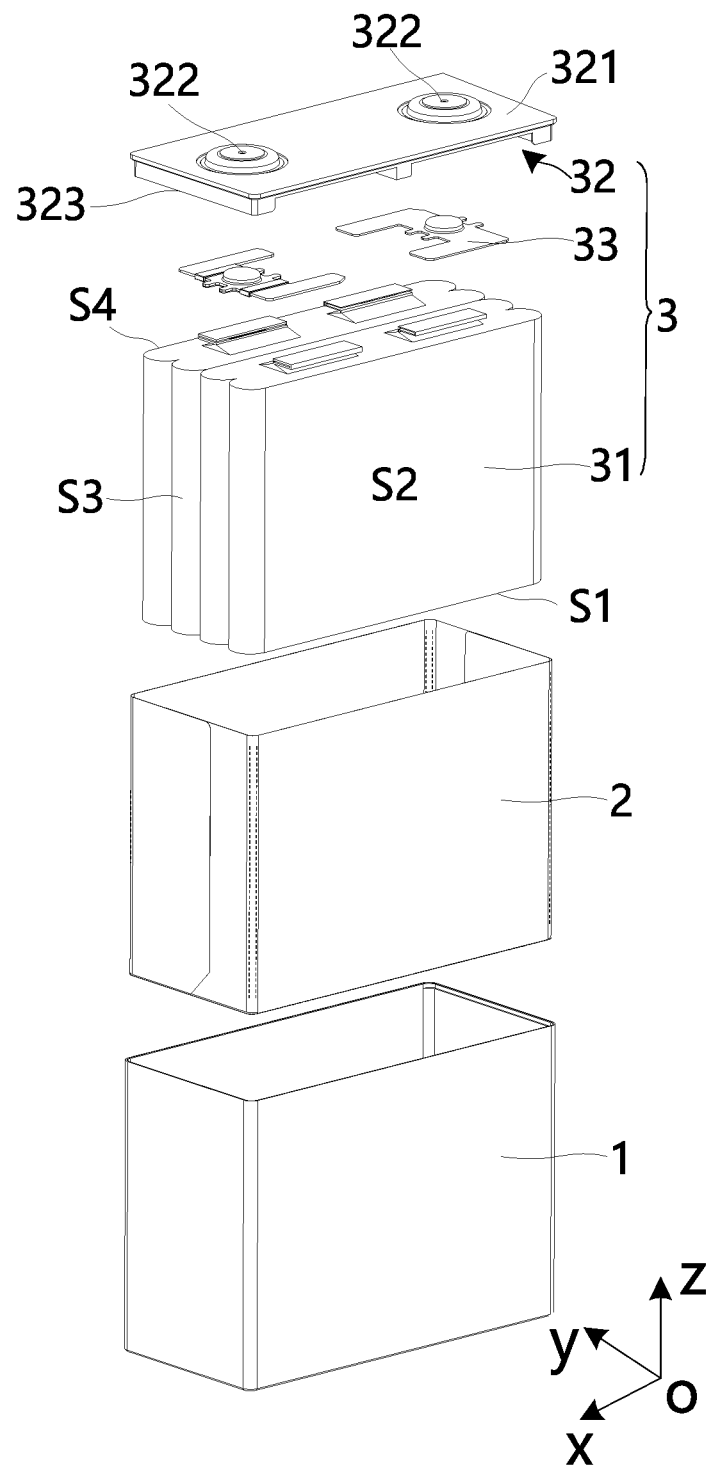
FIG. 1 is a schematic structural diagram of a battery cell according to some embodiments of this application.

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application.

In addition, the terms "first", "second", "third", and so on are merely used for descriptive purposes, but not construed as indicating or implying relative importance. "Perpendicular" does not means exact perpendicularity, but means perpendicularity falling within an error tolerance range.

"Parallel" does not mean exact parallelism, but means parallelism falling within an error tolerance range. The directional terms appearing in the following description indicate the directions shown in the drawings, but are not intended to limit specific structures in this application.

In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Reference to an "embodiment" herein means that a specific feature, structure or characteristic described with reference to this embodiment may be included in at least some embodiments of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

The battery mentioned in embodiments of this application means a unitary physical module that includes a plurality of battery cells to provide a higher voltage and a higher capacity. For example, the battery mentioned in this application may include a battery module, a battery pack, or the like.

A battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in various shapes such as a cylinder, flat body, or cuboid, without being limited in embodiments of this application. Depending on the form of packaging, the battery cell is typically classed into three types: cylindrical battery cell, prismatic battery cell, and pouch-type battery cell. The embodiments of this application do not limit the type of the battery cell.

Currently, a battery cell generally includes a housing and an electrode assembly accommodated in the housing, and the housing is filled with an electrolyte. The electrode assembly is mainly formed by stacking or winding a first electrode plate and a second electrode plate that are of opposite polarities. Generally, a separator is disposed between the first electrode plate and the second electrode plate. The parts, coated with an active material, of the first electrode plate and the second electrode plate, constitute a body portion of the electrode assembly. The parts, coated with no active material, of the first electrode plate and the second electrode plate respectively, constitute a first tab and a second tab respectively. In a lithium-ion battery, the first electrode plate may be a positive electrode plate, and includes a positive current collector and a positive active material layer that overlays both sides of the positive current collector. The positive current collector may be made of a material such as aluminum. The positive active material may be, for example, lithium cobalt oxide, lithium iron phosphate, ternary lithium, or lithium manganese oxide. The second electrode plate may be a negative electrode plate, and includes a negative current collector and a negative active material layer that overlays both sides of the negative current collector. The negative current collector may be made of a material such as copper. The negative active material may be, for example, graphite or silicon. The first tab and the second tab may be located at one end of the body portion together or at two ends of the body portion respectively. In a charge-and-discharge process of the battery cell, the positive active material and the negative active material react with an electrolytic solution. The tabs are connected to electrode terminals to form a current circuit.

The applicant hereof finds in practice that one of the reasons for inferior insulation performance of battery cells currently is that, during the manufacture of a battery cell, after a bare cell is coated with an insulation film (Mylar film), an open end of the insulation film needs to be circumferentially fused to an insulation piece (also known as lower plastic) on an inner side of the end cap body to ensure no gap between the insulation film and the insulation piece.

Currently, the bare cell is coated with the insulation film in the following way: first, a manipulator clamps the cell assembly and places the cell assembly onto the insulation film flat, so that a bottom edge of the end cap component is aligned with one edge of the insulation film for positioning, and is fixed to the edge by fusion; and then the insulation film is bent and turned upward and is fixed to a fixed edge of the end cap component by fusion.

This method of applying the coating of the insulation film is defective in inconsistency of the distance between the edge of the insulation film and the insulation piece. Through research and experiments, the applicant hereof finds that the main reasons are: (1) the cell assembly is not positioned precisely when placed flat on the insulation film, and a free edge of the insulation film is not fixed in a process of turning up the insulation film, and therefore, it is difficult to ensure consistency of the distance between the edge of the insulation film and the insulation piece after the turn-up; and (2) the insulation film is not conveyed by a manipulator, and is conveyed by intermediary transit, and therefore, the insulation film is hardly precisely positioned when placed on the film coating platform, and is prone to misalignment. In a case of the insulation piece is thinner, the relative misalignment of the edge distance is larger.

Due to the above influencing factors, when the bare cell is coated with the insulation film in this way, the distance between the edge of the insulation film and the insulation piece is prone to be improper or inconsistent, and it is difficult to ensure a good fusion effect. In this way, in the battery manufacturing process, the coating of the insulation film of the cell assembly is prone to be substandard. After long-term use, the fusion position is prone to be detached from the insulation piece due to inconsistent edge distances. This phenomenon may lead to inferior insulation reliability of a battery, and a short-circuit problem is prone to occur during use of the battery, thereby posing considerable hazards for the working safety of the battery.

In view of the above technical problems, this application has improved the bare cell film coating apparatus. In order for a person skilled in the art to clearly understand the improvements made by this application to the bare cell film coating apparatus, an overall structure of a battery cell is described first.

As shown in FIG. 1, the battery cell includes a housing 1, an insulation film 2, and a cell assembly 3. The cell assembly 3 is a pre-assembled component. The cell assembly 3 includes a bare cell 31, an end cap component 32, and an adapter 33. The bare cell 31 is disposed in the housing 1, and may be one, two or more in number, depending on the use requirements. From the bare cell 31, two tabs of opposite polarities may be led out. The end cap component 32 includes an end cap body 321, two electrode terminals 322 of opposite polarities, and an insulation piece 323. The two types of electrode terminals 322 are mounted on the end cap body 321. The two electrode terminals 322 are electrically connected to the two tabs respectively by the adapter 33. The end cap body 321 is configured to close the opening of the housing 1, and is connected to the housing 1 to form a shell of the battery cell. The shell is filled with an electrolytic solution.

In order to improve the insulativity between the bare cell 31 and the end cap body 321, the end cap component 32 may further include an insulation piece 323, such as a plastic piece. The insulation piece 323 may be disposed between the end cap body 321 and the bare cell 31. An end face that is of the bare cell 31 and that is away from the end cap component 32 is a first end face S1, and an end face oriented toward the end cap component 32 is a second end face S4. Two lateral faces that are of the bare cell 31 and that are perpendicular to a thickness direction of the bare cell are first lateral faces S2. The first lateral faces S2 are the lateral faces of the largest surface area. Two lateral faces parallel to the thickness direction are second lateral faces S3.

To improve the insulativity between the bare cell 31 and the housing 1, the insulation film 2 is disposed between the bare cell 31 and the housing 1. The bare cell film coating apparatus according to this application may coat an outer wall face of the bare cell 31 with the insulation film 2, and then fit the cell assembly 3 into the housing 1.

Figure 2:
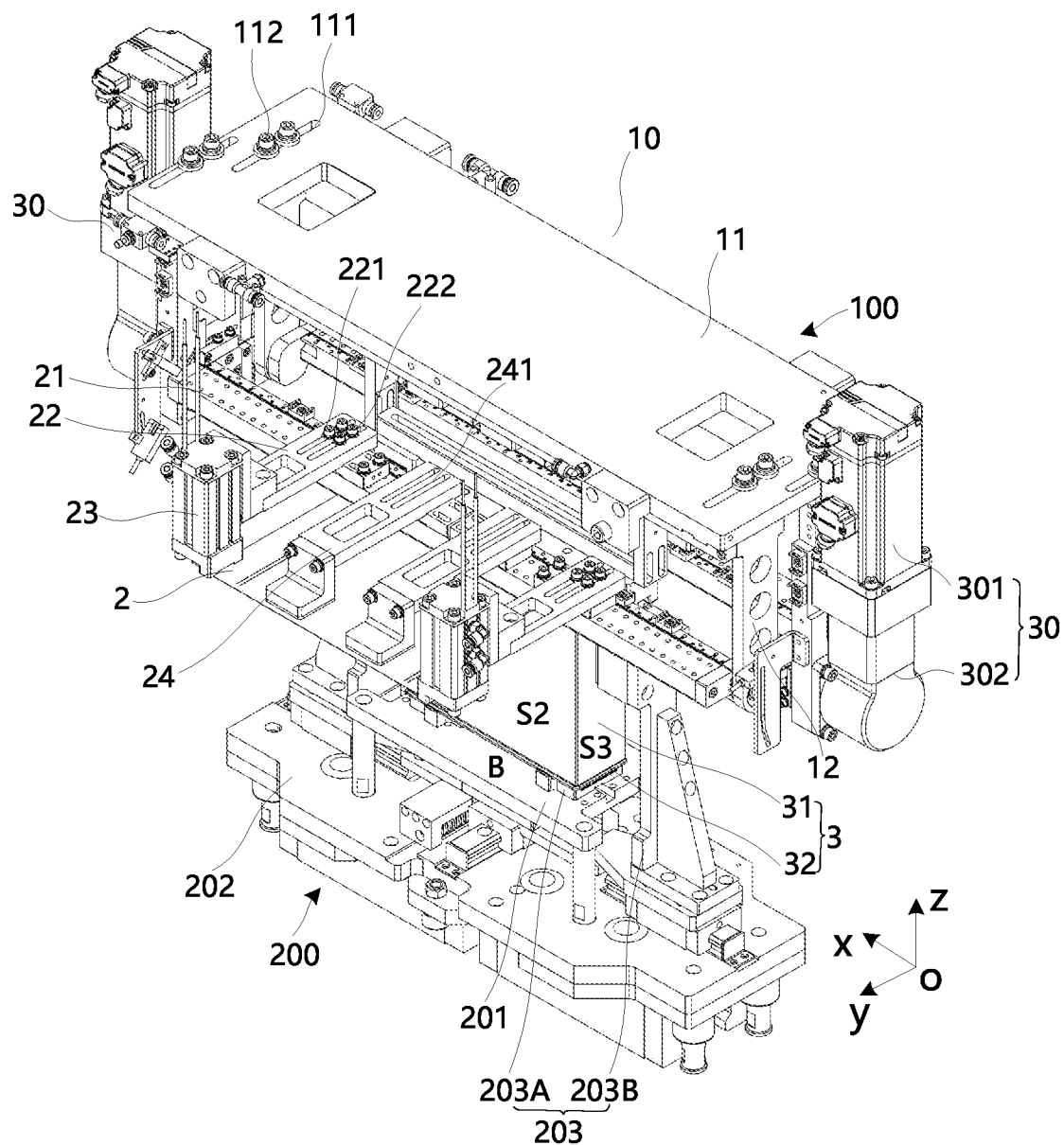
FIG. 2 is a schematic status diagram of a bare cell film coating apparatus before film coating according to some embodiments of this application.
Figure 3:
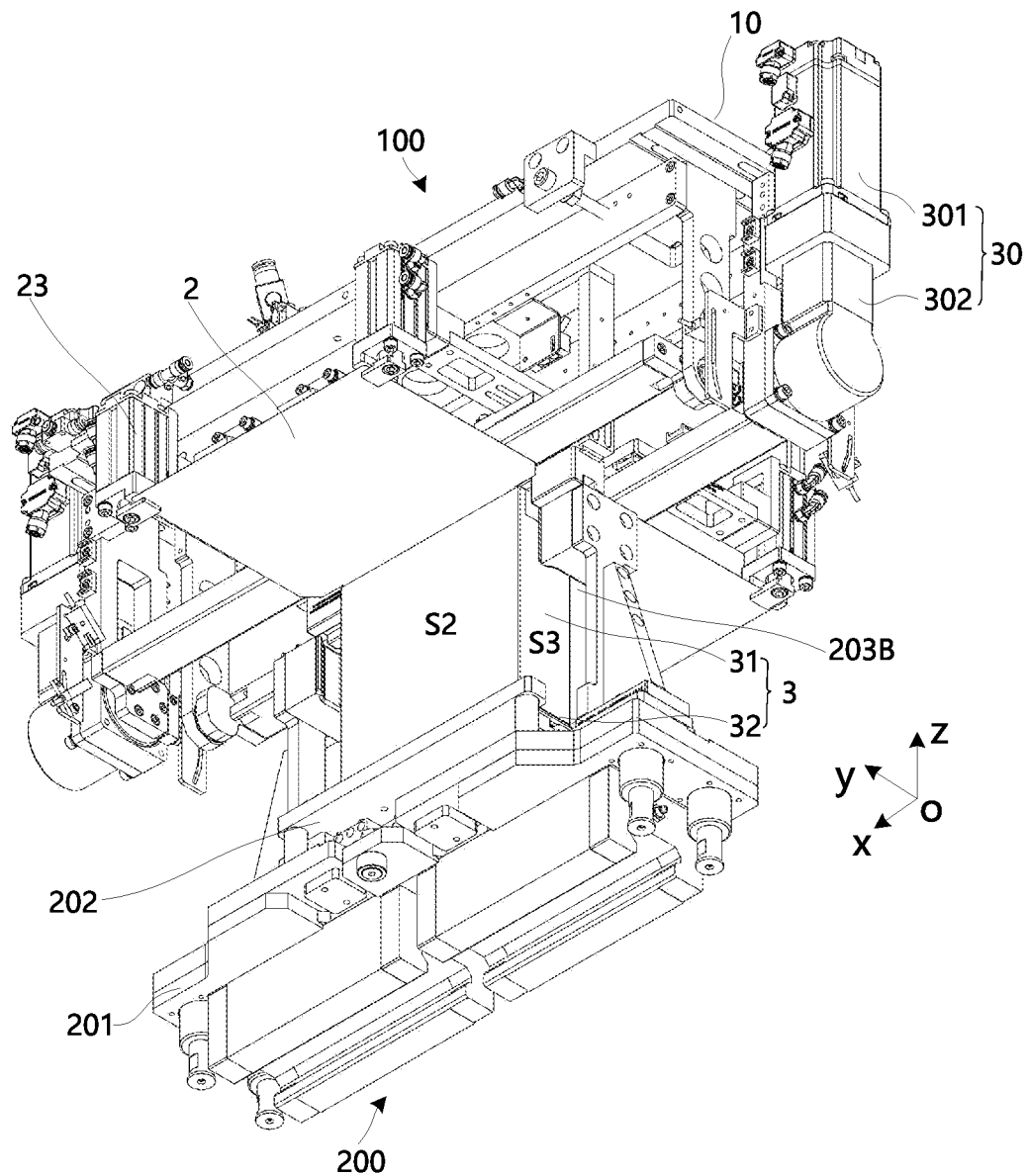
FIG. 3 is a schematic status diagram of a bare cell film coating apparatus after film coating according to some embodiments of this application.

In some embodiments, as shown in FIG. 2 and FIG. 3, this application provides a bare cell film coating apparatus, including a supporting assembly 200 and a film coating assembly 100. The supporting assembly 200 is configured to support the cell assembly 3. The cell assembly 3 may include a bare cell 31 and an end cap component 32 connected to the bare cell 31.

The film coating assembly 100 is configured to apply a coating of an insulation film 2 to the bare cell 31 in the cell assembly 3 placed on the supporting assembly 200. The film coating assembly 100 includes a mounting bracket 10 and two clamping assemblies 20 configured to clamp the insulation film 2. Both clamping assemblies 20 are rotatably disposed on the mounting bracket 10 around a rotation axis consistent with a first direction x and are spaced out along a second direction y. The second direction y is perpendicular to the first direction x. The insulation film 2 in an unfolded state faces a first end face S1 of the bare cell 31. The first end face S1 is a surface that is of the bare cell 31 and that is away from the end cap component 32. The two clamping assemblies 20 are configured to coat the first end face S1 and two first lateral faces S2 of the bare cell 31 with the insulation film 2 in a state of having rotated to a first position toward the first lateral faces S2 of the bare cell 31, and the two first lateral faces S2 intersect the first end face S1. The first lateral faces S2 are perpendicular to the second direction y.

For example, the coating assembly 100 may be located above the supporting assembly 200. Before film coating, the cell assembly 3 is placed upside down on the supporting assembly 200. The term "upside down" means that the end cap component 32 is in contact with the supporting assembly 200, and the bare cell 31 is placed upward.

The clamping assembly 20 may clamp the insulation film 2 by clamping two surfaces of the insulation film 2, or by absorbing, bonding, or other means. As shown in FIG. 2, before the coating of the insulation film 2 is applied, the two clamping assemblies 20 jointly clamp the insulation film 2. In this case, the insulation film 2 is in a horizontal state as a whole, and both clamping assemblies 20 are in the second position. Next, the insulation film 2 is caused to fit, in a third direction z, a surface that is of the bare cell 31 and that is away from the end cap component 32, and the bare cell 31 is caused to be located in a middle position of the two clamping assemblies 20 along the second direction y, so as to implement alignment. The third direction z is perpendicular to the first direction x and the second direction y. For example, the third direction z is a vertical direction, and the first direction x and the second direction y are located in a horizontal plane. The second direction y may be consistent with the thickness direction of the bare cell 31. For a stacked-type bare cell, the thickness direction is a stacking direction of the first electrode plate and the second electrode plate of opposite polarities. For a jelly-roll bare cell, the thickness direction is a direction perpendicular to a flattened face.

As shown in FIG. 3, during film coating, the clamping assemblies 20 are rotated from above to the first position toward the first lateral faces S2 of the bare cell 31. The two clamping assemblies 20 may be rotated to the first position simultaneously or sequentially, so that the insulation film 2 overlays the two first lateral faces S2 of the bare cell 31. The first lateral faces S2 are the largest lateral faces of the bare cell 31. A rotation angle of the clamping assemblies 20 that rotate from the second position to the first position is 90°.

In these embodiments, the cell assembly 3 is placed upside down on the supporting assembly 200 and is coated with an insulation film 2. The end cap component 32 itself is of high processing precision. Therefore, the positioning precision of the cell assembly 3 is improved by using the end cap component 32 as a reference, without a need to realign the cell assembly 3 through an external mechanical structure. In addition, the parts of the insulation film 2 that are located on two sides of the bare cell 31 along the second direction y are clamped by two clamping assemblies 20, and then the clamping assemblies 20 rotate to apply a coating of the insulation film 2. In this way, the insulation film 2 is effectively controlled when being turned up. Moreover, the insulation film 2 can be pulled to the position of an insulation piece 323 in the end cap component 32 by rotating the clamping assemblies 20, thereby implementing centrally aligned coating of the insulation film 2, solving the problem of inconsistent edge distances of the insulation film 2 caused by skew of the bare cell 31, effectively ensuring consistency of a distance between an edge of the insulation film 2 turned up and the insulation piece 323, and improving the fusion effect.

In this way, in the battery manufacturing process, the cell assemblies with substandard coating of the insulation film are reduced. After long-term use, the fusion position is not prone to be detached from the insulation piece due to inconsistent edge distances. The foregoing merits improve the insulation performance of the battery cell, prevent a short-circuit problem from occurring during use of the battery, and improve the working safety of the battery.

In some embodiments, each of the clamping assemblies 20 is configured to apply a coating of the insulation film 2 to a position at which the rotation axis of the clamping assembly coincides with a bent edge of the insulation film 2.

The clamping assembly 20 may be adjusted along at least one of the second direction y or the third direction z until the rotation axis of the clamping assembly 20 coincides with a bent edge of the insulation film 2. The bent edge is a bent edge located between the first lateral face S2 and the end face that is of the bare cell 31 and that is away from the top cap component 32.

These embodiments make the bent edge of the insulation film 2 close to the edge of the bare cell 31, and make the insulation film 2 fit more closely with a sidewall of the bare cell 31, thereby implementing centrally aligned coating of the insulation film 2, effectively ensuring consistency of the distance between the edge of the insulation film 2 turned up and the insulation piece 323, and improving the fusion effect.

Figure 4:
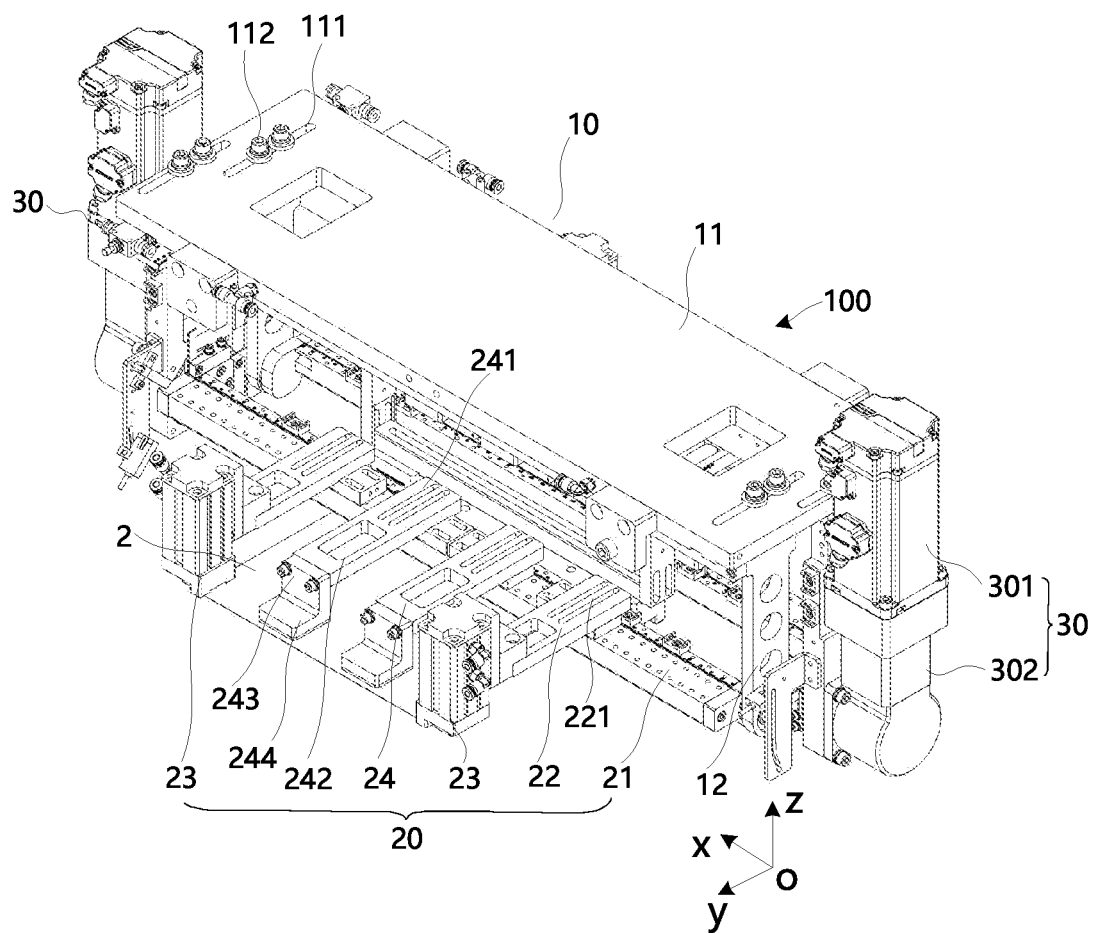
FIG. 4 is a schematic status diagram of a film coating assembly that clamps an insulation film before film coating according to some embodiments.

In some embodiments, as shown in FIG. 4, the film coating assembly 100 further includes two first driving assemblies 30 mounted on the mounting bracket 10 and configured to drive the two clamping assemblies 20 respectively to rotate independently.

The first driving assembly 30 may include: a power component 301 and a transmission component 302. The power component 301 may be an electric machine, a motor, an electric push rod, or the like. The transmission component 302 may be a gear. To achieve a relatively high control precision, the power component 301 may be a servo motor to improve the action precision of film coating and accurately pull the insulation film 2 to a preset position.

For example, the power component 301 is a motor that outputs rotary motion, with an output shaft disposed along a third direction z. A bevel gear or a worm gear transmission mechanism may be disposed in the transmission component 302 to make the clamping assemblies 20 rotate around a rotation axis.

Specifically, two first driving assemblies 30 may be mounted on two ends of a mounting bracket 10 along the first direction x respectively. This structure downsizes the film coating assembly 100 along the second direction y, provides a relatively large mounting space for both first driving assemblies 30, and facilitates maintenance. Optionally, the two first driving assemblies 30 may be mounted on the same end of the mounting bracket 10 along the first direction separately.

In these embodiments, one first driving assembly 30 is disposed for each of the two clamping assemblies 20, thereby automatically controlling the rotation of the clamping assemblies 20 to implement automatic film coating, pulling the insulation film 2 precisely to a preset position to ensure consistency of the distance between the edge of the insulation film 2 and the insulation piece 323, improving the fusion effect, and ensuring reliability of insulation.

In some embodiments, the two first driving assemblies 30 are configured to drive the two clamping assemblies 20 to rotate synchronously.

These embodiments make the insulation films 2 on the two sides of the bare cell 31 turn up simultaneously, and make the force consistent on the two sides of the insulation film 2, thereby improving the central alignment of the insulation film 2 with the bare cell 21 during coating of the film, and ensuring consistency of the distance between the edge of the insulation film 2 and the insulation piece 323 along two sides of the second direction y, improving the fusion effect, and ensuring reliability of insulation. In addition, the first end face S1 and the two first lateral faces S2 of the bare cell 31 can be coated within only the time required for the rotation of a single clamping assembly 20.

In some embodiments, as shown in FIG. 4, each clamping assembly 20 includes two grippers 23 spaced out along the first direction x. Positions of the four grippers 23 are configured to clamp four corners of the insulation film 2 respectively.

Figure 5:
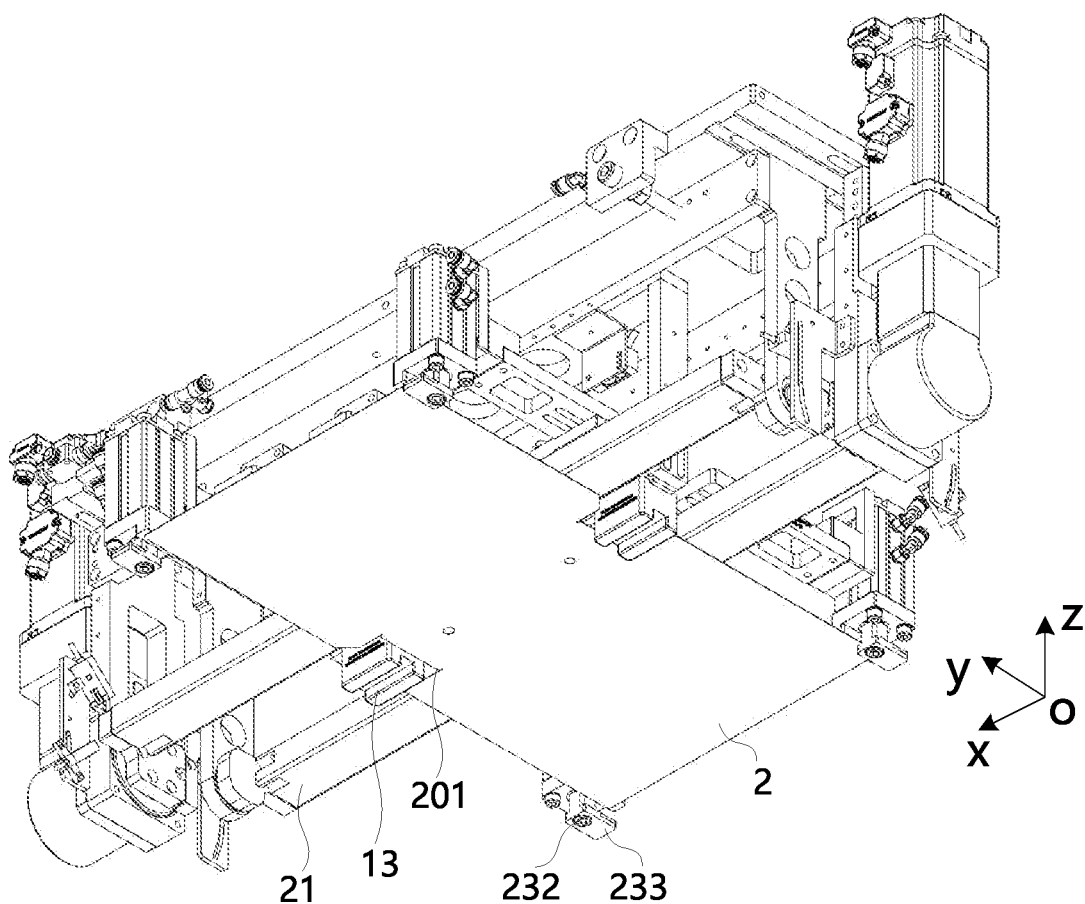
FIG. 5 is a schematic status diagram of a film coating assembly in which a gripper unclamps an insulation film.

For example, as shown in FIG. 5, the gripper 23 may be a finger cylinder, including a cylinder body 231, a piston rod 232, and a stopper 233. One end of the piston rod 232 extends into the cylinder body 231, and the other end is exposed out of the cylinder body 231 and connected to the stopper 233. The stopper 233 is rotatable against the piston rod 232. The piston rod 232 extends along the third direction z.

Figure 6:
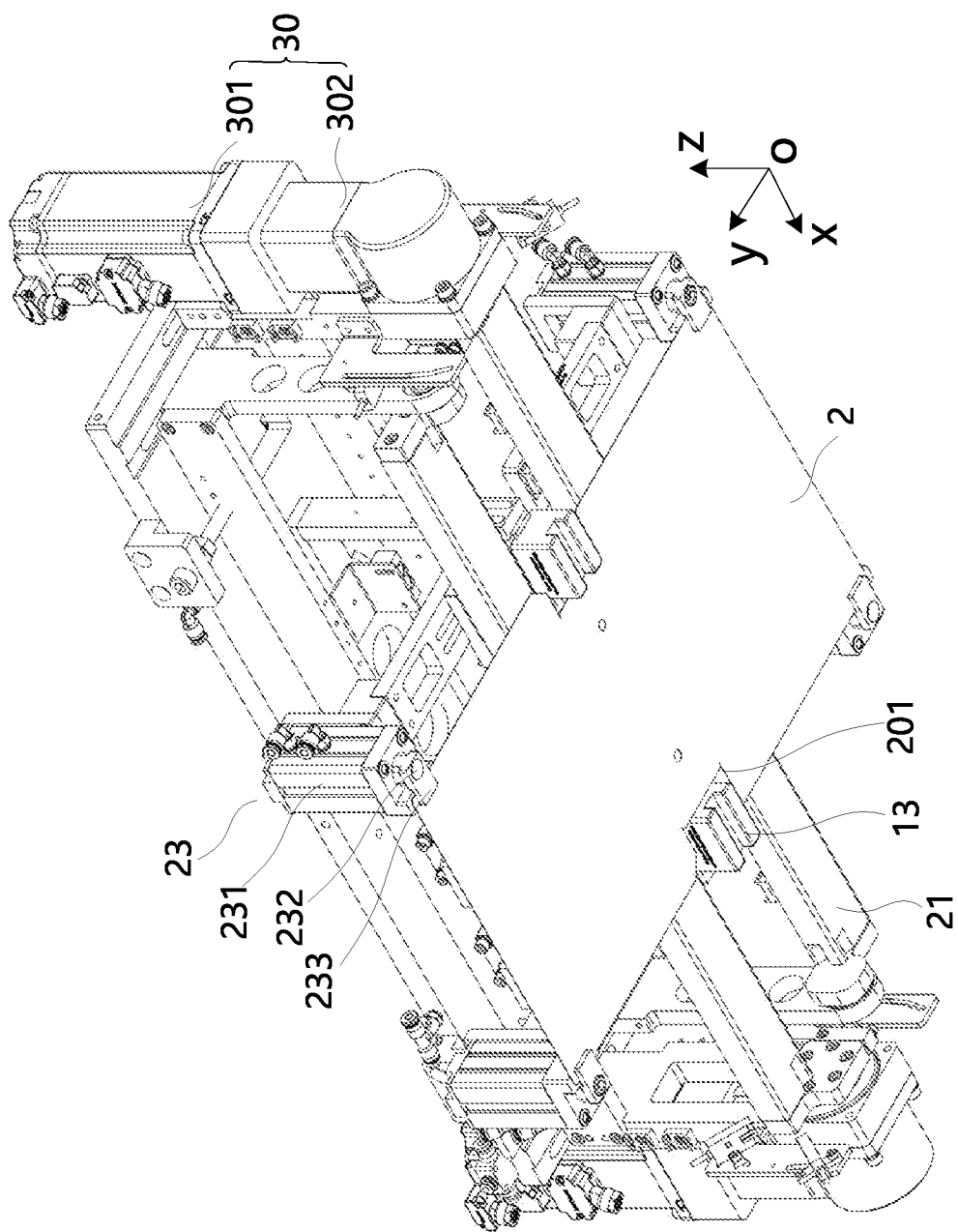
FIG. 6 is a schematic status diagram of a film coating assembly in which a gripper clamps an insulation film.

As shown in FIG. 5, when the insulation film 2 needs to be gripped, the stopper 233 swings to the outside of the insulation film 2 and keeps a preset distance from the cylinder body 231 in the third direction z. The film coating assembly 100 moves downward along the third direction z until the insulation film 2 fits closely with the cylinder body 231. As shown in FIG. 6, the piston rod 232 is swung inward to the position of the insulation film 2, and the piston rod 232 is retracted to grip a corner position of the insulation film 2. To improve the positioning accuracy in gripping the insulation film 2, the film coating assembly 100 may further include two positioning pieces 12 spaced out along the first direction x. A notch 201 is made in a middle position of each of two lateral edges that are of the insulation film 2 and that extend along the second direction y. The positioning pieces 12 are embedded into the notches 201 to position the insulation film 2.

Optionally, the gripper 23 may be a structure other than the finger cylinder, such as a stopper mounted on an electric push rod; or, the gripper 23 may be a manipulator that clamps the insulation film 2.

In these embodiments, the four corners of the insulation film 2 are clamped by four grippers 23 respectively, so that the insulation film 2 can be steadily conveyed to the top of the cell assembly 3. In a process of turning up the insulation film 2 along two sides of the second direction y, a constraint force can be exerted on a free end of the insulation film 2, and a traction force can be exerted on the two ends of the insulation film 2 when the first driving assembly 30 drives the clamping assemblies 20 to rotate to implement film coating, thereby ensuring consistency of the distance between the edge of the insulation film 2 and the insulation piece 323, improving the fusion effect, and ensuring reliability of insulation.

In some embodiments, as shown in FIG. 4, each clamping assembly 20 further includes a first beam 21 and two second beams 22. The first beam 21 extends along the first direction x. Two ends of the first beam 21 are rotatably mounted on the mounting bracket 10 around the rotation axis. First ends of the two second beams 22 are connected to the first beam 21 at intervals along the first direction x. One gripper 23 is mounted at a second end of each of the two second beams 22. For example, the second beam 22 may extend along the second direction y.

In these embodiments, the first driving assembly 30 drives the first beam 21 to rotate, and the two second beams 22 drive the two grippers 23 to turn up the insulation film 2. The structure is simple, and the two grippers 23 on the same side can move synchronously, thereby ensuring a good fit of the insulation film 2 that overlays the bare cell 31.

In some embodiments, mounting positions of the second beams 22 are adjustable against the first beam 21 along the second direction y. For example, a first long round hole 221 extending along the second direction y is made on each second beam 22, so as to implement position adjustment of the second beam 22.

In these embodiments, by adjusting the mounting positions of the second beams 22 on the first beam 21, the distance between the gripper 23 and the first beam 21 along the second direction y can be changed so as to adapt to the bare cells 31 of different heights for film coating.

In some embodiments, as shown in FIG. 4, the film coating assembly 100 further includes two first driving assemblies 30 mounted at two ends of the mounting bracket 10 respectively along the first direction x. The two first driving assemblies 30 are configured to drive the two clamping assemblies 20 respectively to rotate. Mounting positions of the first beam 21 and the first driving assembly 30 connected to the first beam are adjustable along the second direction y.

For example, the mounting bracket 10 includes a base board 11 and four connecting beams 12. The base board 11 is disposed horizontally. Two connecting beams 12 are disposed at each of two ends of the base board 11 along the first direction x. The two connecting beams 12 at the same end are spaced out along the second direction y. The connecting beams 12 extend along the third direction z. Two ends of each first beam 21 are connected to two connecting beams 12 respectively. A first driving assembly 30 is mounted on one of the connecting beams 12. Four second long round holes 111 extending along the second direction y are made in the base board 11. The four second long round holes 111 are disposed corresponding to the four connecting beams 12 respectively. A first fastener 112 is fixed to the connecting beam 12 after passing through the second long round hole 111. To increase the adjustment range, the two second long round holes 111 at the same end of the base board 11 may be staggered along the first direction x.

In these embodiments, by adjusting the position of the first beam 21 along the second direction y, the distance between the two first beams 21 can be adjusted to adapt to the bare cells 31 of different thicknesses for film coating, thereby improving universal applicability of the bare cell film coating apparatus.

In some embodiments, as shown in FIG. 4, each of the clamping assemblies 20 includes a pressure exertion piece 24 configured to exert a pressure on the insulation film 2 when the clamping assembly 20 is in the first position, so as to make the insulation film fit the bare cell 31. The pressure exertion piece 24 may exert a pressure on an edge region of the insulation film 2 along the second direction y.

In each clamping assembly 20, one pressure exertion piece 24 may be disposed; or, at least two pressure exertion pieces may be disposed along the first direction x. The at least two pressure exertion pieces 24 may be spaced out. As shown in FIG. 4, the pressure exertion piece 24 in each clamping assembly 20 may be connected to the first beam 21, and located between two second beams 22. For example, the pressure exertion piece 24 may include a fourth beam and an L-shaped board. A first end of the fourth beam 242 is connected to the first beam 21. A first board 243 of the L-shaped board is in a vertical state, and a top of the first board is fixed to the fourth beam 242. A second board 244 of the L-shaped board is in a horizontal state, and extends away from the fourth beam 242. When the four grippers 23 jointly clamp the insulation film 2 that is in a planar state, the second board 244 fits the insulation film 2.

Figure 7:
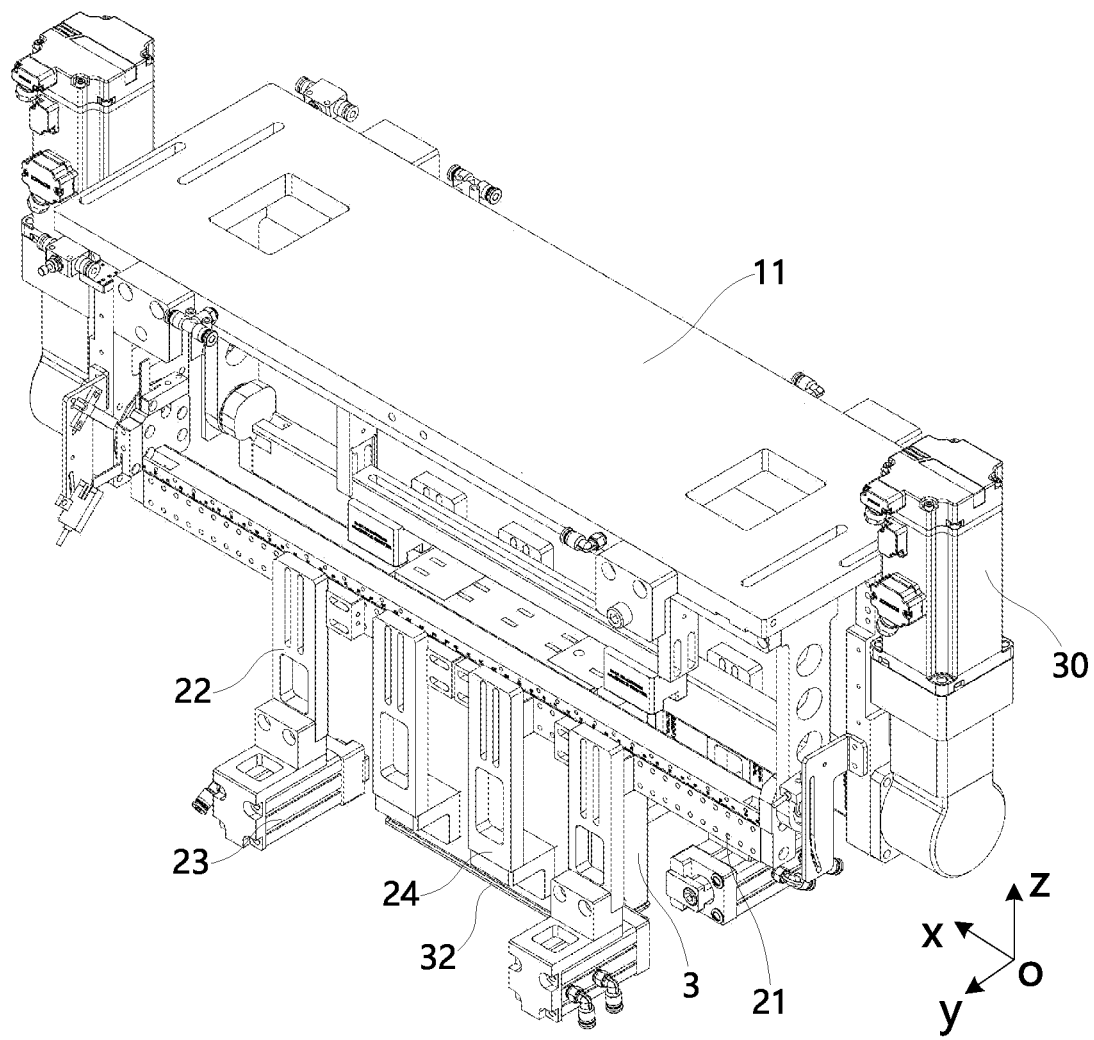
FIG. 7 is a schematic status diagram of a film coating assembly after film coating viewed from a viewing angle according to some embodiments.
Figure 8:
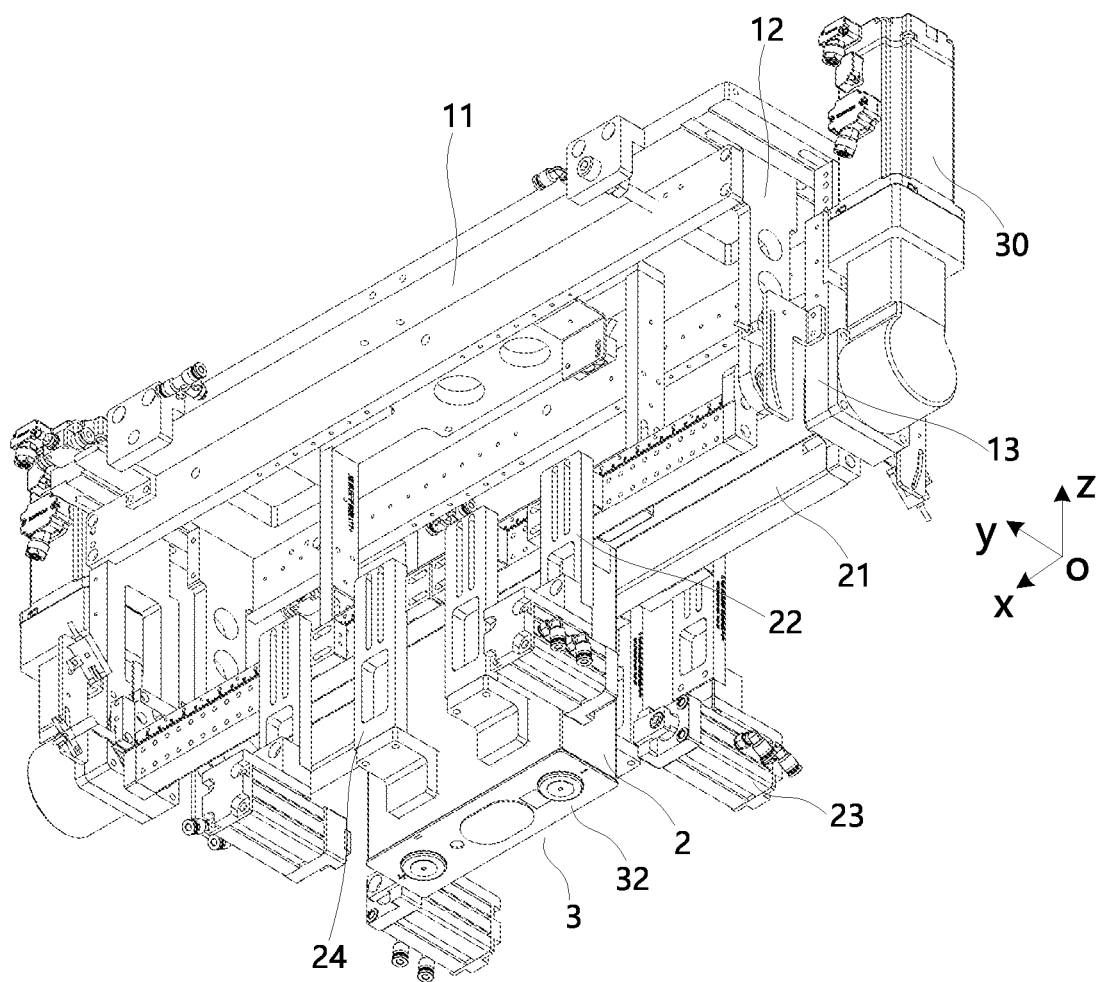
FIG. 8 is a schematic status diagram of a film coating assembly after film coating viewed from another viewing angle according to some embodiments.

As shown in FIG. 7 and FIG. 8, when the pressure exertion piece 24 is rotated to the first position, the pressure exertion piece 24 can press the insulation film 2 down on the first lateral face S2 of the bare cell 31. Specifically, the pressure exertion piece 24 is rotated by 90° on the basis of FIG. 6. The fourth beam 242 extends along the third direction z, and keeps at a preset distance from the insulation film 2. The first board 243 is in a horizontal state and extends toward the bare cell 31. The second board 244 is in a vertical state and fits the insulation film 2, and is configured to exert a pressure on the insulation film 2 when the clamping assembly 20 is in the first position, so as to fit the bare cell 31.

In these embodiments, the pressure exertion piece 24 can work together with the two grippers 23 on the same side to limit the position of an edge region of the insulation film 2 along the second direction y, so as to prevent the edge from deforming in a process of turning up the insulation film 2, thereby implementing a steady status of the insulation film 2, ensuring consistency of the distance between the edge of the insulation film 2 and the insulation piece 323, improving the fusion effect, and ensuring reliability of insulation.

In some embodiments, as shown in FIG. 4, a mounting position of the pressure exertion piece 24 is adjustable along the second direction y. For example, a third long round hole 241 may be made in the pressure exertion piece 24 to adjust the mounting position of the pressure exertion piece 24 against the first beam 21 along the second direction y.

In these embodiments, by adjusting the mounting position of the pressure exertion piece 24 along the second direction y, the distance between a pressure exertion position and the first beam 21 can be adjusted. In this way, the pressure exertion piece 24 can press down on the edge region of the insulation film 2 when the bare cells 31 of different heights are coated with an insulation film, thereby preventing the edge of the insulation film 2 from warping, ensuring consistency of the distance between the edge of the insulation film 2 and the insulation piece 323, improving the fusion effect, and ensuring reliability of insulation.

In some embodiments, the two clamping assemblies 20 are configured to jointly clamp the insulation film 2 when the bare cell 31 is rotated to the second position along the two sides of the second direction y, where the insulation film is planar as a whole. As shown in FIG. 4, when a clamping assembly 20 is in the second position, the second beam 22 extends along the second direction y, and clamping ends of the four grippers 23 are in the same horizontal plane. When the gripper 23 is an air cylinder, a piston rod 232 of the air cylinder extends along the third direction z. In this case, the insulation film 2 is planar as a whole.

In these embodiments, the insulation film 2 in a horizontal state in the film gripping position A can be gripped jointly by the two clamping assemblies 20, thereby preventing unnecessary bending of the insulation film 2 during the conveyance. The relative position relationship between the insulation film 2 and the bare cell 31 can be adjusted easily before film coating, so as to ensure a proper distance between the edge of the insulation film 2 and the insulation piece 323.

In some embodiments, a film coating position B is disposed on the supporting assembly 200. The film coating position B is configured to be located in a middle position of the two clamping assemblies 20 along the second direction y during film coating. The film coating position B may be fixedly disposed in the middle position of the two clamping assemblies 20, and the position relationship between a clamping assembly 20 and the film coating position may be adjusted before film coating.

In these embodiments, the film coating position B can be caused to be located in the middle position of the two clamping assemblies 20 during film coating, and the insulation film 2 can be aligned properly with the bare cell 31 along the second direction y. In this way, the distance between the edge of the insulation film 2 and the insulation piece 232 keeps consistent between the two sides of the insulation film, thereby improving insulation performance of the cell assembly 3.

Figure 9:
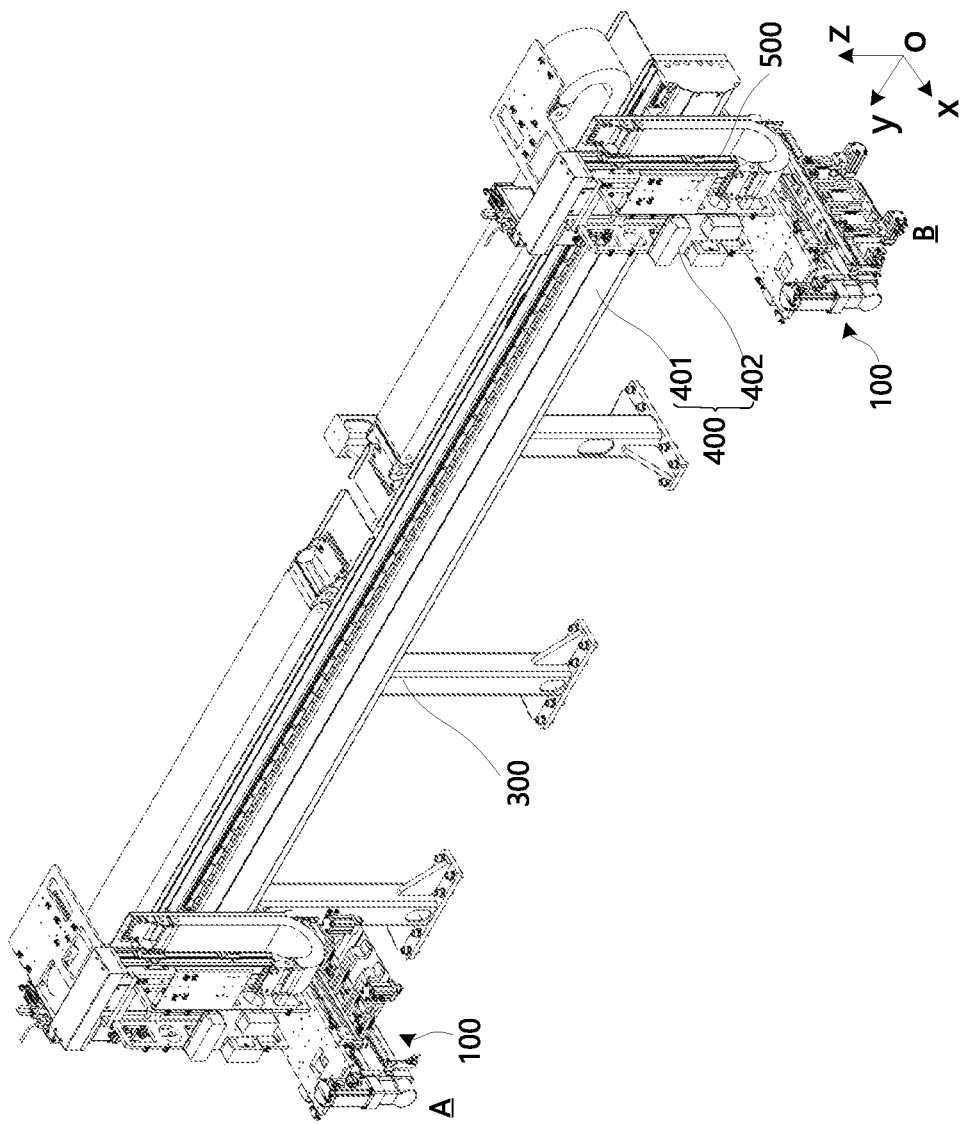
FIG. 9 is a schematic diagram of a film coating assembly that moves between a film gripping position and a film coating position along a second direction.

In some embodiments, as shown in FIG. 9, the bare cell film coating apparatus further includes a supporting bracket 300 and a second driving assembly 400. The film coating assembly 100 is mounted on the supporting bracket 300 and is movable against the supporting bracket 300 along the second direction y. The second driving assembly 400 is configured to drive the film coating assembly 100 to move along the second direction y, so as to reach a film gripping position A or reach a film coating position B on the supporting assembly 200.

The film gripping position A may be located on a fusion platform. The fusion platform is a base holder plate that is fusion-welded on the insulation film 2. The insulation film 2 is fused after being applied as a coating. The fusion is to thermally fuse the edge of the insulation film 2 to the insulation piece 323. The supporting bracket 300 may include a plurality of brackets spaced out along the second direction y to improve the supporting strength. The second driving assembly 400 may be a linear motor. The linear motor includes a stator 401 and a mover 402. The stator 401 may be elongated. An extension length of the stator is from the film gripping position A to the film coating position B. The mover 402 may be disposed in the film coating assembly 100. A magnetic field generated by a current drives the mover 402 to move along the stator 401 in an energized state. Such a second driving assembly 400 improves steadiness of the movement of the film coating assembly 100, prevents the insulation film 2 from wobbling or being additionally stressed during conveyance, and ensures accuracy of positioning of the film coating assembly 100 that stays at the film gripping position A or the film coating position B. Optionally, the second driving assembly 400 may be a transmission mechanism such as a chain or a belt.

In these embodiments, by disposing the second driving assembly 400, the film coating assembly 100 can be moved transversely so as to move between the film gripping position A and the film coating position B. In this way, the insulation film 2 can be automatically conveyed from the film gripping position A to the film coating position B, and can reach the film coating position B by being gripped only once without a need to be conveyed for a plurality of times, thereby improving the positioning precision of the insulation film 2 during film coating.

In some embodiments, as shown in FIG. 9, the bare cell film coating apparatus further includes a supporting bracket 300 and a third driving assembly 500. The film coating assembly 100 is movably mounted on the supporting bracket 300 along the third direction z. The third direction z is perpendicular to the first direction x and the second direction y. The third driving assembly 500 is configured to drive the film coating assembly 100 to move along the third direction z.

For example, the third driving assembly 500 may be a motor in conjunction with a lead screw nut transmission mechanism, where the motor is outputs a rotary motion; or, may be a linear motor or an electric push rod or the like.

In these embodiments, the position of the film coating assembly 100 along the third direction z is adjusted by the third driving assembly 500. Therefore, when gripping the insulation film, the clamping assembly 20 can adapt to the height of the insulation film 2 placed on the fusion platform, and, before film coating, can adjust the insulation film 2 to fit the end face that is of the bare cell 31 and that is away from the end cap component 32, so as to improve the film coating effect, and further, can adapt to the bare cells 31 of different heights for film coating.

In some embodiments, the supporting assembly 200 is in contact with the end cap component 32 to support the cell assembly 3. The bare cell 31 is located above the end cap component.

In these embodiments, the cell assembly 3 is disposed upside down. The positioning of the cell assembly 3 can be implemented in the film coating process through the end cap component 32, thereby improving the positioning precision and facilitating the film coating through the rotation of the two clamping assemblies 20.

In some embodiments, as shown in FIG. 2, the supporting assembly 200 includes a first platform 201 and a positioning component 203. The first platform 201 is configured to hold the cell assembly 3. The positioning component 203 is configured to position the end cap component 32.

The positioning component 203 may include a supporting base 203A. The supporting base 203A is fixed onto the first platform 201. Two positioning slots are made on a surface that is of the supporting base 203A and that is away from the first platform 201. The positioning slots are configured to work together with the electrode terminals 322 to position the end cap component 32. Optionally, the positioning component 203 may further include two lateral brackets 203B located on two sides of the cell assembly 3 along the first direction x respectively and configured to provide positioning for two second lateral faces S3 that are of the bare cell 21 and that are perpendicular to the first direction x. The position of the lateral brackets 203B along the first direction x is adjustable.

Optionally, the supporting assembly 200 may further include a second platform 202. The first platform 201 is mounted above the second platform 202. The area of the second platform 202 is larger than that of the first platform 201, so that a structural member can be conveniently arranged on the second platform 202 without affecting the space required for coating the bare cell 31 with the insulation film. Further, the processing precision of the first platform 201 alone may be increased to ensure the positioning precision of the cell assembly 3 during film coating. The lateral brackets 203B may be mounted on the second platform 202.

In these embodiments, the positioning component 203 is disposed to position the end cap component 32 so as to provide positioning for the cell assembly 3. The end cap body 321 in the end cap component 32 is of relatively high processing precision. Therefore, the positioning performed through the end cap body 321 and electrode terminals 322 can improve the positioning precision of the cell assembly 3 during film coating, thereby ensuring consistency of the distance between the edge of the insulation film 2 and the insulation piece 232, and improving the insulation performance of the cell assembly 3.

In some specific embodiments, as shown in FIG. 2 to FIG. 9, the bare cell film coating apparatus according to this application includes a supporting assembly 200, a film coating assembly 100, and a supporting bracket 300. As shown in FIG. 9, the film coating assembly 100 is mounted on the supporting bracket 300 and is movable against the supporting bracket 300 along the second direction y. The second driving assembly 400 is configured to drive the film coating assembly 100 to move along the second direction y, so as to reach a film gripping position A or reach a film coating position B on the supporting assembly 200.

As shown in FIG. 2 and FIG. 3, the supporting assembly 200 is configured to support the cell assembly 3, the structure of which has been described above.

As shown in FIG. 4, the film coating assembly 100 includes a mounting bracket 10 and two clamping assemblies 20 configured to clamp the insulation film 2. The mounting bracket 10 includes a base board 11 and four connecting beams 12. The base board 11 is disposed horizontally. Two connecting beams 12 are disposed at each of two ends of the base board 11 along the first direction x. The two connecting beams 12 at the same end are spaced out along the second direction y. The connecting beams 12 extend along the third direction z. Two ends of each first beam 21 are connected to two connecting beams 12 respectively. A first driving assembly 30 is mounted on one of the connecting beams 12. Four second long round holes 111 extending along the second direction y are made in the base board 11. The four second long round holes 111 are disposed corresponding to the four connecting beams 12 respectively. A first fastener 112 is fixed to the connecting beam 12 after passing through the second long round hole 111.

Each clamping assembly 20 further includes a first beam 21 and two second beams 22. The first beam 21 extends along the first direction x. Two ends of the first beam 21 are rotatably mounted on the mounting bracket 10 around the rotation axis. First ends of the two second beams 22 are connected to the first beam 21 at intervals along the first direction x. One gripper 23 is mounted at a second end of each of the two second beams 22.

A method for coating the bare cell 31 with an insulation film by using the bare cell coating apparatus according to an embodiment is as follows:

1. As shown in FIG. 2, the end cap component 32 of the cell assembly 3 is caused to contact the first platform 201 of the supporting assembly 200, and is placed upside down on the first platform 201 of the supporting assembly 200. Two electrode terminals 322 are embedded into the positioning slots of the two supporting bases 203A respectively, where the bare cell 31 is located between the two lateral brackets 203B.
2. The position of the first fastener 112 in the second long round hole 111 is adjusted according to the thickness of the bare cell 31, so as to change the distance between the two first beams 21 to adapt to the thickness of the bare cell 31. Further, the relative position of the second beam 22 against the first beam 21 along the second direction y may be adjusted according to the height of the bare cell 31, or the relative position of the pressure exertion piece 24 against the first beam 21 along the second direction y is adjusted.
3. As shown in FIG. 9, the second driving assembly 400 drives the film coating assembly 100 to move along the second direction y to reach the film gripping position A, and four grippers 23 jointly grip the insulation film 2. The gripped insulation film 2 is in a horizontal state as a whole. The film coating assembly 100 is caused to move along the second direction y to reach the film coating position.
4. As shown in FIG. 4 to FIG. 6, the clamping assembly 20 is in a second position. In this case, the two second beams 22 and the fourth beam 242 that is located in the pressure exertion piece 24 are all in a horizontal state and extend along the second direction y, and the insulation film 2 is in a horizontal state as a whole. The third driving assembly 500 drives the film coating assembly 100 to move toward the bare cell 31 along the third direction z until the insulation film 2 fits the end face that is of the bare cell 31 and that is away from the end cap component 32.
5. As shown in FIG. 7 and FIG. 8, the first driving assembly 30 causes the two clamping assemblies 20 to rotate relatively. When the clamping assemblies rotate to the first position, two sides of the insulation film 2 fit the two first lateral faces S2 of the bare cell 31 along the second direction y. The pressure exertion piece 24 exerts a pressure on the insulation film 2, so that the insulation film 2 fits effectively with the bare cell 31. By this time, the first end face S1 and the two second lateral faces S2 of the bare cell 31 have finished being coated with the insulation film Upon completion of film coating, fusion is performed to fuse the edge of the insulation film 2 to the insulation piece 323.

Next, an embodiment of this application provides a battery manufacturing system, including the bare cell film coating apparatus according to the foregoing embodiment. Optionally, the battery manufacturing system may further include a fusion apparatus configured to fuse the edge of the insulation film 2 to the insulation piece 323. Two fusion apparatuses may be disposed, and may be located on two sides of the supporting assembly 200 along the second direction y. After completion of film coating, the two clamping assemblies 20 may be rotated away from the bare cell 31 to leave the bare cell 31. In this case, fusion may be performed by two fusion apparatuses sequentially or simultaneously.

In this embodiment, the two sides of the bare cell 31 can be coated with the insulation film simultaneously, and can be fused simultaneously after film coating, thereby implementing parallel operation of a plurality of modules, improving the production efficiency of battery cells, improving space efficiency, speeding up the production process, improving the production efficiency, and solving the problems of high manufacturing cost and high labor cost.

Figure 10:
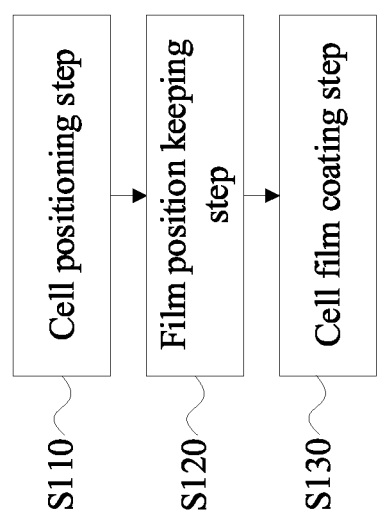
FIG. 10 is a schematic flowchart of a bare cell film coating method according to some embodiments of this application.

Finally, this application provides a bare cell film coating method. As shown in FIG. 10, in some embodiments, the method includes the following steps:

S110: a cell positioning step: positioning a cell assembly 3 onto a supporting assembly 200, where the cell assembly 3 includes a bare cell 31 and an end cap component 32 connected to the bare cell 31;

S120: a film position keeping step: causing an insulation film 2 in an unfolded state to face a first end face S1 of the bare cell 31, where the first end face S1 is a surface that is of the bare cell 31 and that is away from the end cap component 32; and S130: a cell film coating step: causing both of two clamping assemblies 20 in the film coating assembly 100 to rotate to a first position toward first lateral faces S2 of the bare cell 31 in the cell assembly 3, and coating the first end face S1 and two first lateral faces S2 of the bare cell 31 with the insulation film 2, where the two first lateral faces S2 intersect the first end face S1.

The two clamping assemblies 20 are configured to clamp the insulation film 2, and are both rotatably disposed on the mounting bracket 10 in the film coating assembly 100 around a rotation axis consistent with a first direction x. The two clamping assemblies 20 are spaced out along a second direction y. The second direction y is perpendicular to the first direction x.

The sequence between step S110 and step S120 is not limited. Step S130 is performed after step S110 and step S120.

In these embodiments, the cell assembly 3 is placed upside down on the supporting assembly 200 and is coated with an insulation film 2. The end cap component 32 itself is of high processing precision. Therefore, the positioning precision of the cell assembly 3 is improved by using the end cap component 32 as a reference, without a need to realign the cell assembly 3 through an external mechanical structure. In addition, the parts of the insulation film 2 that are located on two sides of the bare cell 31 along the second direction y are clamped by two clamping assemblies 20, and then the clamping assemblies 20 rotate to apply a coating of the insulation film 2. In this way, the insulation film 2 is effectively controlled when being turned up. Moreover, the insulation film 2 can be pulled to the position of an insulation piece 323 in the end cap component 32 by rotating the clamping assemblies 20, thereby implementing centrally aligned coating of the insulation film 2, solving the problem of inconsistent edge distances of the insulation film 2 caused by skew of the bare cell 31, effectively ensuring consistency of a distance between an edge of the insulation film 2 turned up and the insulation piece 323, and improving the fusion effect.

In some embodiments, the bare cell film coating method further includes:

adjusting, before the cell film coating step, the two clamping assemblies 20 along the second direction y, so that the bare cell 31 is located in a middle position of the two clamping assemblies 20 along the second direction y; and adjusting a position of the film coating assembly 100 along a third direction z so that the insulation film 2 fits, in the third direction z, an end face that is of the bare cell 31 and that is away from the end cap component 32 in the cell assembly 3, where the third direction z is perpendicular to the first direction x and the second direction y.

The sequence between these two steps is not limited. The positions of the clamping assemblies 20 along the second direction y may be adjusted by passing a first fastener 112 through a second long round hole 111. The position of the film coating assembly 100 along the third direction z may be adjusted by the third driving assembly 500.

In these embodiments, the bare cell 31 can be caused to be located in the middle position of the two clamping assemblies 20 during film coating, and the insulation film 2 can be aligned properly with the bare cell 31 along the second direction y. Moreover, the insulation film 2 is caused to fit the end face that is of the bare cell 31 and that is away from the end cap component 32, thereby improving the degree of fit between the insulation film 2 and the bare cell 31, reducing the clearance between the edges on the two sides of the insulation film 2 and the insulation piece 232, keeping the distance between the edge of the insulation film 2 and the insulation piece 232 consistent between the two sides of the insulation film, and in turn, improving insulation performance of the cell assembly 3.

In some embodiments, the bare cell film coating method further includes:

causing the film coating assembly 100 to move to a film gripping position A along the second direction y to grip the insulation film 2; and causing the film coating assembly 100 to move from the film gripping position A to a film coating position B on the supporting assembly 200 along the second direction y.

These two steps may be performed before step S110, or between step S110 and step S120.

In these embodiments, by disposing the second driving assembly 400, the film coating assembly 100 can be moved transversely so as to move between the film gripping position A and the film coating position B. In this way, the insulation film 2 can be automatically conveyed from the film gripping position A to the film coating position B, and can reach the film coating position B by being gripped only once without a need to be conveyed for a plurality of times, thereby improving the positioning precision of the insulation film 2 during film coating.

Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A bare cell film coating apparatus, comprising:
a supporting assembly, configured to support a cell assembly, wherein the cell assembly comprises a bare cell and an end cap component connected to the bare cell, the cell assembly disposed upside down on the supporting assembly with the end cap component being in direct contact with the supporting assembly; and
a film coating assembly, configured to apply a coating of an insulation film to the bare cell in the cell assembly placed on the supporting assembly, wherein the film coating assembly comprises a mounting bracket and two clamping assemblies configured to clamp the insulation film, both clamping assemblies are rotatably disposed on the mounting bracket around a rotation axis consistent with a first direction and are spaced out along a second direction, and the second direction is perpendicular to the first direction; the insulation film in an unfolded state faces a first end face of the bare cell, and the first end face is a surface that is of the bare cell and that is away from the end cap component; and the two clamping assemblies are configured to coat the first end face and two first lateral faces of the bare cell with the insulation film in a state of having rotated to a first position toward the first lateral faces of the bare cell, and the two first lateral faces intersect the first end face,
wherein each of the clamping assemblies comprises a pressure exertion structure to exert a pressure on the insulation film against the two first lateral faces of the bare cell when the clamping assembly is in the first position, so as to make the insulation film fit the bare cell.

2. The bare cell film coating apparatus according to claim 1, wherein each of the clamping assemblies is configured to apply a coating of the insulation film to a position at which the rotation axis of the clamping assembly coincides with a bent edge of the insulation film.

3. The bare cell film coating apparatus according to claim 1, wherein the film coating assembly further comprises two first driving assemblies mounted on the mounting bracket and configured to drive the two clamping assemblies respectively to rotate independently.

4. The bare cell film coating apparatus according to claim 3, wherein the two first driving assemblies are configured to drive the two clamping assemblies to rotate synchronously.

5. The bare cell film coating apparatus according to claim 3, wherein each clamping assembly comprises two grippers spaced out along the first direction, and positions of the four grippers are configured to clamp four corners of the insulation film respectively.

6. The bare cell film coating apparatus according to claim 5, wherein each clamping assembly further comprises a first beam and two second beams, the first beam extends along the first direction, two ends of the first beam are rotatably mounted on the mounting bracket around the rotation axis, first ends of the two second beams are connected to the first beam at intervals along the first direction, and one gripper is mounted at a second end of each of the two second beams.

7. The bare cell film coating apparatus according to claim 6, wherein mounting positions of the second beams are adjustable against the first beam along the second direction.

8. The bare cell film coating apparatus according to claim 6, wherein the film coating assembly further comprises two first driving assemblies mounted at two ends of the mounting bracket respectively along the first direction, the two first driving assemblies are configured to drive the two clamping assemblies respectively to rotate, and mounting positions of the first beam and the first driving assembly connected to the first beam are adjustable along the second direction.

9. The bare cell film coating apparatus according to claim 1, wherein a mounting position of the pressure exertion piece is adjustable along the second direction.

10. The bare cell film coating apparatus according to claim 1, wherein the two clamping assemblies are configured to jointly clamp the insulation film when the bare cell is rotated to a second position along two sides of the second direction, wherein the insulation film is planar as a whole.

11. The bare cell film coating apparatus according to claim 1, wherein a film coating position is disposed on the supporting assembly, and the film coating position is configured to be located in a middle position of the two clamping assemblies along the second direction during film coating.

12. The bare cell film coating apparatus according to claim 1, further comprising a supporting bracket and a second driving assembly, wherein the film coating assembly is mounted on the supporting bracket and is movable against the supporting bracket along the second direction, and the second driving assembly is configured to drive the film coating assembly to move along the second direction, so as to reach a film gripping position or reach a film coating position on the supporting assembly.

13. The bare cell film coating apparatus according to claim 1, further comprising a supporting bracket and a third driving assembly, wherein the film coating assembly is movably mounted on the supporting bracket along the third direction, the third direction is perpendicular to the first direction and the second direction, and the third driving assembly is configured to drive the film coating assembly to move along the third direction.

14. The bare cell film coating apparatus according to claim 1, wherein the supporting assembly is in contact with the end cap component to support the cell assembly, and the bare cell is located above the end cap component.

15. The bare cell film coating apparatus according to claim 14, wherein the supporting assembly comprises:
a first platform, configured to hold the cell assembly; and
a positioning component, configured to position the end cap component.

16. A battery manufacturing system, comprising a bare cell film coating apparatus, wherein the bare cell film coating apparatus comprises:
a supporting assembly, configured to support a cell assembly, wherein the cell assembly comprises a bare cell and an end cap component connected to the bare cell, the cell assembly disposed upside down on the supporting assembly with the end cap component being in direct contact with the supporting assembly; and
a film coating assembly, configured to apply a coating of an insulation film to the bare cell in the cell assembly placed on the supporting assembly, wherein the film coating assembly comprises a mounting bracket and two clamping assemblies configured to clamp the insulation film, both clamping assemblies are rotatably disposed on the mounting bracket around a rotation axis consistent with a first direction and are spaced out along a second direction, and the second direction is perpendicular to the first direction; the insulation film in an unfolded state faces a first end face of the bare cell, and the first end face is a surface that is of the bare cell and that is away from the end cap component; and the two clamping assemblies are configured to coat the first end face and two first lateral faces of the bare cell with the insulation film in a state of having rotated to a first position toward the first lateral faces of the bare cell, and the two first lateral faces intersect the first end face,
wherein each of the clamping assemblies comprises a pressure exertion structure to exert a pressure on the insulation film against the two first lateral faces of the bare cell when the clamping assembly is in the first position, so as to make the insulation film fit the bare cell.

* * * * *